US012705486B1

(12) United States Patent
Settle et al.

(10) Patent No.: US 12,705,486 B1
(45) Date of Patent: Aug. 11, 2026

(54) PRUNING FILTERS FROM CONVOLUTIONAL NEURAL NETWORKS

(71) Applicant: Xilinx, Inc., San Jose, CA (US)

(72) Inventors: Sean Settle, San Jose, CA (US); Paolo D'Alberto, San Jose, CA (US)

(73) Assignee: XILINX, INC., San Jose, CA (US)

( * ) Notice: Subject to any disclaimer, the term of this patent is extended or adjusted under 35 U.S.C. 154(b) by 1090 days.

(21) Appl. No.: 16/952,502

(22) Filed: Nov. 19, 2020

(51) Int. Cl.
*G06N 3/082* (2023.01)
*G06N 3/04* (2023.01)

(52) U.S. Cl.
CPC ............... *G06N 3/082* (2013.01); *G06N 3/04* (2013.01)

(58) Field of Classification Search
CPC ................................. G06N 3/082; G06N 3/04
See application file for complete search history.

(56) References Cited

U.S. PATENT DOCUMENTS 11,113,601 B1 * 9/2021 Xiao ........................ G06N 3/04
12,026,608 B2 * 7/2024 Kataeva ................. G06N 20/00
2016/0358068 A1 * 12/2016 Brothers ................ G06N 3/045
2018/0232640 A1 * 8/2018 Ji ........................... G06N 3/045
2019/0294929 A1 * 9/2019 Yao ....................... G06F 18/217
2020/0005119 A1 * 1/2020 Shemesh ................ G06N 3/082
2020/0364572 A1 * 11/2020 Senn ...................... G06N 3/045
2020/0364573 A1 * 11/2020 Ramachandran ...... G06N 3/063
2021/0073643 A1 * 3/2021 Partovi Nia ........... G06N 3/045
2021/0073644 A1 * 3/2021 Lin ........................ G06N 3/082
2021/0089841 A1 * 3/2021 Mithun .................... G06N 3/04
2021/0104041 A1 * 4/2021 Clifton ..................... A61B 3/14
2022/0083866 A1 * 3/2022 Wang ...................... H04L 69/04

OTHER PUBLICATIONS

Tang Y, You S, Xu C, Han J, Qian C, Shi B, Xu C, Zhang C. Reborn filters: Pruning convolutional neural networks with limited data. InProceedings of the AAAI Conference on Artificial Intelligence Apr. 3, 2020 (vol. 34, No. 04, pp. 5972-5980). (Year: 2020).*

Li, Shiyu, et al. "Penni: Pruned Kernel Sharing for Efficient CNN Inference." International Conference on Machine Learning. PMLR, 2020. (Year: 2020).*

(Continued)

*Primary Examiner* — Henry Nguyen

(74) *Attorney, Agent, or Firm* — Patterson + Sheridan, LLP

(57) ABSTRACT

Levels of cross-correlation between pairs of original filters in the layers of a convolutional neural network (CNN) are determined and used in pruning the filters. The pruning includes, for one or more pairs of the pairs of original filters having a level of cross-correlation that satisfies a pruning threshold, determining a scale factor between first and second filters of the one or more pairs, and storing data that identify the first filter, the second filter, and the scale factor. The pruning further includes modifying the initial CNN into a modified CNN by removing the second filter of the one or more pairs and adjusting convolution logic of the CNN, and adding regeneration logic to the modified CNN. The regeneration logic generates an output channel corresponding to the second filter of the one or more pairs based on the scale factor and an output channel produced by the first filter.

20 Claims, 8 Drawing Sheets

(56) References Cited

OTHER PUBLICATIONS

Hao Li, Asim Kadav, Igor Durdanovic, Hanan Samet, and Hans Peter Graf; "Pruning Filters for Efficient ConvNets"; arXiv:1608.08710v3 [cs.CV]; Mar. 10, 2017; Published as a conference paper at ICLR 2017.

Song Han, Huizi Mao, and William J. Dally; "Deep Compression: Compressing Deep Neural Networks With Pruning, Trained Quantization and Huffman Coding"; arXiv:1510.00149v5 [cs.CV]; Feb. 15, 2016; Published as a conference paper at ICLR 2016.

Aidan N. Gomez, Ivan Zhang, Kevin Swersky, Yarin Gal, and Geoffrey E. Hinton; "Targeted Dropout"; CDNNRIA Workshop at he 32nd Conference on Neural Information Processing Systems (NeurIPS 2018); Montreal, Canada.

Davis Blalock, Jose Javier Gonzalez Ortiz, Jonathan Frankle, and John Guttag; "What is the State of Neural Network Pruning"; arXiv:2003.03033v1 [cs.LG]; Mar. 6, 2020; Proceedings of the 3rd MLSys Conference, Austin, TX, USA; Copyright 2020.

* cited by examiner convolution layer 106' input tensor 112 pruned filters in layer of modified ML model filter 114' convolution 116 output channels 132 regeneration 134

136 regenerated output channel output channel 118'

FIG. 2

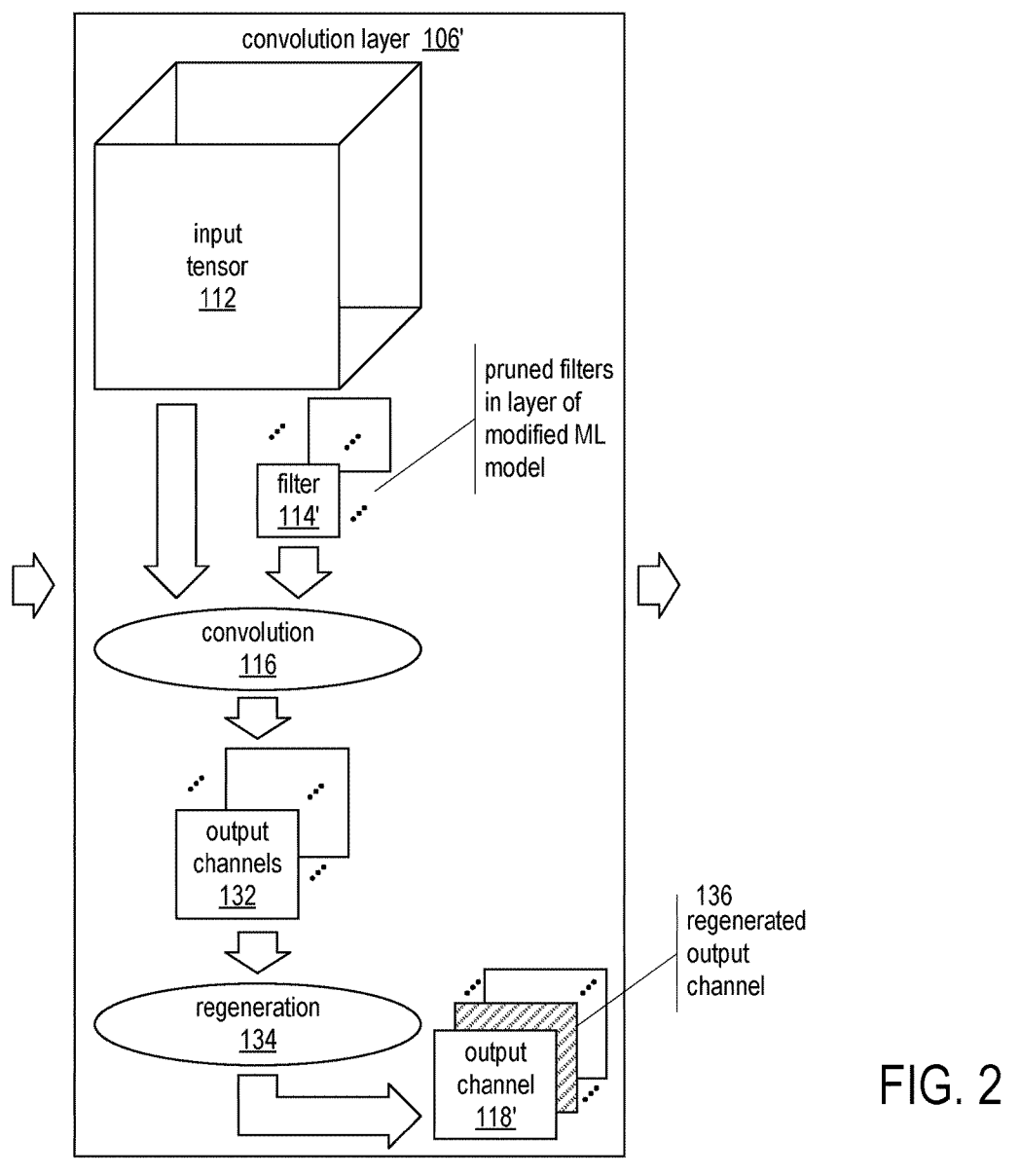

PRUNING FILTERS FROM CONVOLUTIONAL NEURAL NETWORKS

TECHNICAL FIELD

The disclosure generally relates to pruning filters from convolutional neural networks.

BACKGROUND

Pruning convolutional neural networks (CNNs) is a model optimization technique that reduces the operation count and buffer memory size prior to the compilation stage. Some prior pruning techniques use variations of magnitude-based analyses to remove negligibly-zero output channels. However, to maintain accuracy magnitude-based analysis must be performed during the training loop. Singular-value decomposition is another pruning technique. However, singular-value decomposition but is strictly linear in nature.

SUMMARY

A disclosed method includes determining by a computer processor, in each layer of a plurality of layers of an initial convolutional neural network (CNN), respective levels of cross-correlation between pairs of original filters in the layer. Each pair includes a first filter and a second filter. The method includes pruning filters from the layers of the CNN and the pruning includes, for one or more pairs of the pairs of original filters having a level of cross-correlation that satisfies a pruning threshold performing operations that include determining a scale factor between the first filter and the second filter of the one or more pairs, and storing data that identify the first filter, the second filter, and the scale factor. The pruning also includes modifying the initial CNN into a modified CNN by removing the second filter of the one or more pairs and adjusting convolution logic of the CNN. The pruning includes adding regeneration logic to the modified CNN. The regeneration logic is configured to generate an output channel corresponding to the second filter of the one or more pairs based on the scale factor and an output channel produced by the first filter.

A disclosed system includes one or more processors and a memory arrangement configured with instructions that when executed by the one or more processors cause the one or more processors to perform a number of operations. The operations include determining, in each layer of a plurality of layers of an initial convolutional neural network (CNN), respective levels of cross-correlation between pairs of original filters in the layer, each pair including a first filter and a second filter. The operations also include pruning filters from the layers of the CNN. The pruning includes, for one or more pairs of the pairs of original filters having a level of cross-correlation that satisfies a pruning threshold, determining a scale factor between the first filter and the second filter of the one or more pairs, and storing data that identify the first filter, the second filter, and the scale factor. The pruning also includes modifying the initial CNN into a modified CNN by removing the second filter of the one or more pairs and adjusting convolution logic of the CNN. The pruning includes adding regeneration logic to the modified CNN. The regeneration logic is configured to generate an output channel corresponding to the second filter of the one or more pairs based on the scale factor and an output channel produced by the first filter.

Other features will be recognized from consideration of the Detailed Description and Claims, which follow.

BRIEF DESCRIPTION OF THE DRAWINGS

Various aspects and features of the methods and systems will become apparent upon review of the following detailed description and upon reference to the drawings in which:

FIG. 2 shows a modified convolution layer after pruning of filters;

DETAILED DESCRIPTION

Figure 1:
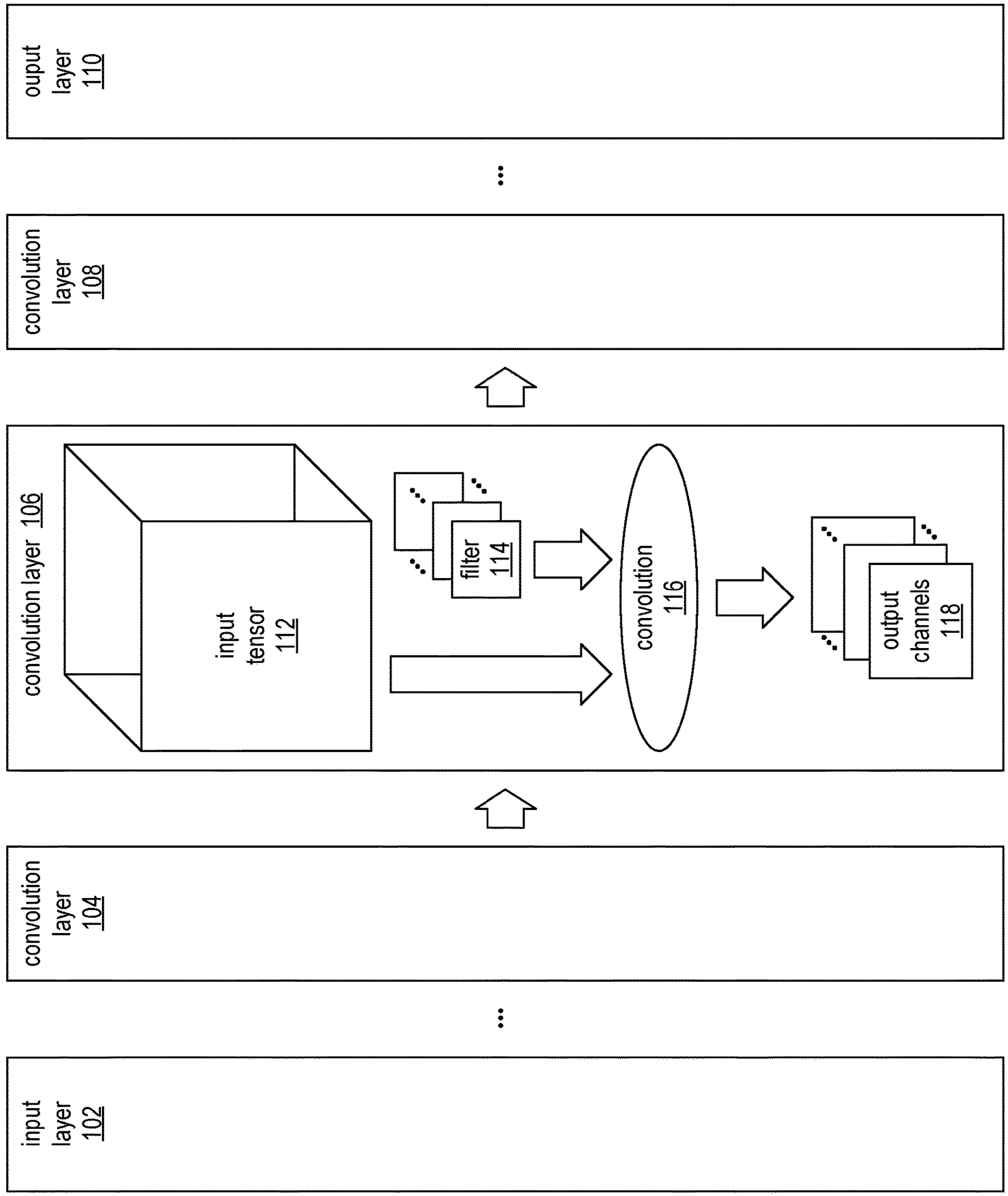
FIG. 1 illustrates layers of an exemplary CNN ML model prior to pruning of filters.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed approaches overcome limitations of the prior art. The disclosed pruning methods enable removal of non-zero output channels and can be performed without retraining. The disclosed pruning techniques can prune more channels than prior approaches because both linear and non-linear similarities can be identified. According to the disclosed methods and systems, pruning involves comparing pairs of filters across the input channels within each layer of the CNN through cross-correlation.

Filters are shifted in the spatial dimensions in order to capture non-linear similarities between the filters. Without shifting, only linear similarities would be recognized. If two filters are determined to be similar enough, one of the two can be removed from the computation and the corresponding channel output can be reinserted with significantly fewer computations than convolving the input with the removed filter.

FIG. 1 illustrates layers of an exemplary CNN ML model 100 prior to pruning of filters. FIG. 1 is shown to illustrate multiple convolution layers, with the output channels from one layer providing input data to the next layer in the model. It will be recognized that an actual CNN can have pooling layers or RELU layers connected between the convolution layers (not shown) and a fully-connected layer following the last convolution layer.

The model includes input layer 102, multiple convolution layers 104, 106, 108, and an output layer 110. The input layer 102 can read input data from a data source and format the data for processing by the convolution layer 104. The output layer 110 can format and output data to a user, storage device, network, or an automation system that acts on the results.

Convolution layer 106 shows the general data flow and processing of a convolution layer. The convolution process 116 convolves input tensor 112 with filters 114 and produces output channels 118. The input tensor 112 and filters 114 can vary according to the application. For example, the input tensor can represent an image having red, green, and blue channels, and the filters can be different filters for the different channels. The output channels from a convolution layer can be the input tensor to the next convolution layer. For example, output channels 118 can be the input tensor to convolution layer 108. Alternatively, a pooling or RELU layer can generate the input tensor to a convolution layer.

The disclosed methods and systems can significantly reduce the processing requirements of a convolution layer and of the CNN by identifying similarities between pairs of the filters 114, removing one filter of each pair if the filters of the pair are sufficiently similar, and modifying the CNN to include logic that restores the output channel(s) lost as a result of removal of a filter(s). It has been found that as many as 20% of the filters in the initial layers of common CNNs can be removed by pruning. With retraining and/or calibrating it is expected that even more filters could be removed.

FIG. 2 shows a modified convolution layer 106' after pruning of filters from convolution layer 106 of FIG. 1. Filters 114' illustrate the filters that remain after pruning the filters 114 of FIG. 1. That is, filters 114' comprise a subset of the filters 114.

Convolving the input tensor 112 with fewer filters produces fewer output channels. In the example, convolution process 116 convolves input tensor 112 with filters 114' and produces output channels 132, which are a subset of the channels 118 of FIG. 1. To provide the expected number of output channels for the next stage of the CNN, the regeneration process 134 restores each channel that was not generated by the convolution process 116 due to removal of the corresponding filter during pruning. For example, output channel 136 is generated by regeneration logic 134 to restore the channel of output data that would have been generated by a filter removed from the filters 114 of FIG. 1.

Figure 3:
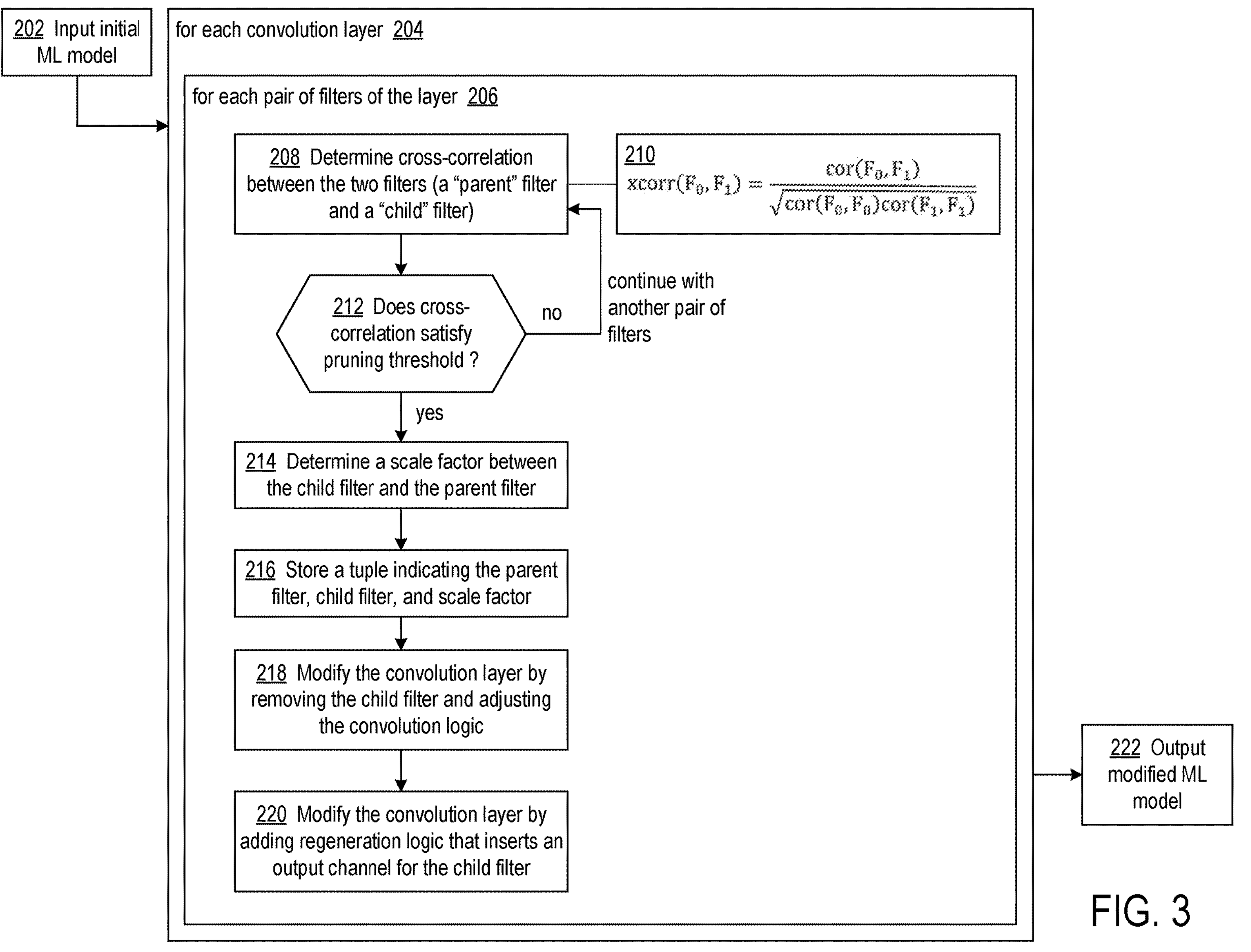
FIG. 3 shows a flowchart of an exemplary process for pruning filters of a CNN.

FIG. 3 shows a flowchart of an exemplary process for pruning filters of a CNN according to the disclosed methods and systems. The process inputs an initial ML model having a CNN at block 202 and generates a modified ML model at block 222 based on pruning of the CNN filters.

Pruning is performed on each convolution layer at block 204, and for each layer all possible pairs of filters are evaluated for pruning as shown by block 206. At block 208 the system determines the similarity between all pairs of filters using cross-correlation calculations as specified in block 210. The terms "parent" filter and "child" filter are used to refer to the filters in a pair of filters in which the similarity between the parent filter and the child filter is sufficient to merit removal of the child filter from the model. The parent filter remains part of the model.

For general notational purposes, convolution of an input tensor having shape [n, c, w] and a filter having shape [k, c, r] produces an output tensor having shape [n, k, q], where n is the batch size, c is the number of input channels, w is the input width, k is the number of output channels, r is the kernel width, and q is the output width. For the filter tensor, r represents a spatial dimension and k and c represent the spectral dimensions.

To initially illustrate the similarity analysis, the following examples involve one-dimensional convolution ("Conv1D"). The explanation is expanded to two and three dimensional convolutions near the end of the description.

The cross-correlation between two filters, $F_0$ and $F_1$, which indicates the level of similarity between the filters, is defined as follows:

$$xcorr(F_0, F_1) = \frac{cor(F_0, F_1)}{\sqrt{cor(F_0, F_0)cor(F_1, F_1)}}$$

The correlation function, "cor( )", is illustrated with Example 1 involving filters, $F_0$ and $F_1$, and input tensor I. Output values O0, O1, and O3 are computed by cor($F_0$, $I_0$), cor($F_0$, $I_1$), and cor($F_0$, $I_2$), respectively; and output values O3, O4, and O5 are computed by from cor($F_1$, $I_0$), cor($F_1$, $I_1$), and cor($F_1$, $I_2$), respectively.

I=[I0, I1, I2, I3], i.e., n=1, c=1, and w=4

Filters=[[F0, F1]], [[F2, F3]], i.e., k=2, c=1, and r=2

Then

Output=[[O0, O1, O2], [O3, O4, O5]], i.e., n=1, k=2, and q=3, where $$\text{For filter } F_0 = [F0, F1], \text{ output } O_i^0 = \sum\nolimits_{j=0}^{r-1} F_j, I_{i+j} = cor(F_0, I_i)$$

$$O0=cor(F_0,I_0)=[F0,F1]*[I0,I1]=F0*I0+F1*I1$$

$$O1=cor(F_0,I_1)=[F0,F1]*[I1,I2]=F0*I1+F1*I2$$

$$O2=cor(F_0,I_2)=[F0,F1]*[I3,I4]=F0*I2+F1*I3$$

$$\text{For filter } F_1 = [F2, F3], O_i^1 = \sum\nolimits_{i=0}^{r-1} F_j, I_{i+j} = cor(F_1, I_i)$$

$$O3=cor(F_1,I_0)=[F2,F3]*[I0,I1]=F2*I0+F3*I1$$

$$O4=cor(F_1,I_1)=[F2,F3]*[I0,I1]=F2*I1+F3*I2$$

$$O5=cor(F_1,I_2)=[F2,F3]*[I0,I1]=F2*I2+F3*I3$$

Example 1

Based on Example 1, the terms in the cross-correlation function that involve the cor( ) function expand as follows:

$$cor(F_0,F_1)=F0*F2+F1*F3$$

$$cor(F_0,F_0)=F0*F0+F1*F1$$

$$cor(F_1,F_1)=F2*F2+F3*F3$$

Example 2

The expansion of the cross-correlation of F0 and F1 expands to:

$$x\ corr(F_0,F_1)=(F0*F2+F1*F3)/sqrt((F0*F0+F1*F1)*(F2*F2+F3*F3))$$

In determining the level of cross-correlation between two filters at block 208, the pruning process can also determine the level of cross-correlation with index shifts of the filters by one or more column index positions (left and right) and one or more row index positions (up and down). The evaluation of the cross-correlation with index shifts identifies non-linear similarities between filters.

With no shifting of index positions, the cross-correlation function provides an indication of the level of similarity between two filters based on element-to-element computations in the cor( ) function at the same index positions of the filters. In Example 2, the cor( ) function of $F_0$ and $F_1$ with no shifting of index positions is:

$$cor(F_0, F_1)=F0*F2+F1*F3$$

With shifting of index positions, the cross-correlation function provides an indication of the level of similarity between two filters based on element-to-element computations in the cor( ) function with shifts by one or more index positions of elements of one of the filters relative the index positions elements of the other filter.

That is, if both of the filters $F_0$ and $F_1$ have i elements at index positions 0 through i−1, a right shift of 1 index position involves computing the cor($F_0$, $F_1$) function using elements 1 through i−1 of one of the filters. For example, the cross-correlation can involve computing cor($F_0$, $F_1$) using elements 0 through i−2 of $F_0$ and elements 1 through i−1 of $F_1$. The cross-correlation using a right-shift of 1 index position for $F_1$ can be expressed as:

$$xcorr(F_{0\gg 1}, F_{1\gg 1}) = \frac{cor(F_{0\gg 1}, F_{1\gg 1})}{cor(F_0, F_0)cor(F_1, F_1)}$$

Using the filters $F_0$ and $F_1$ from Example 1 and right shifting the index of $F_1$ right by one position, the cross-correlation can be expanded to:

$$x\ \mathrm{corr}(F_{0>>1}, F_{1>>1})=(F0*F3)/\mathrm{sqrt}(F0*F0+F1*F1)*(F2*F2+F3*F3)$$

Note that the numerator (cor($F_{0>>1}$, $F_{1>>1}$)) reduces to (F0*F3) because of the shift.

Similarly, the cross-correlation using a left-shift of 1 index position for $F_1$ can be expressed as:

$$xcorr(F_{0\ll 1}, F_{1\ll 1}) = \frac{cor(F_{0\ll 1}, F_{1\ll 1})}{\sqrt{cor(F_0, F_0)cor(F_1, F_1)}}$$

The cross-correlation can be expanded to:

$$x\ \mathrm{corr}(F_{0<<1}, F_{1<<1})=(F1*F2)/\mathrm{sqrt}((F0*F0+F1*F1)*(F2*F2+F3*F3))$$

At block 208, the pruning process computes the levels of cross-correlations for all desired index positions of the pair of filters. For example, the levels of cross-correlation can be computed for no shift of index position, right shifts by 1 through M index positions, and left shifts by 1 through N index positions.

If none of the levels of cross-correlation satisfies a pruning threshold, then the pruning process can continue at block 208 with another pair of filters. Otherwise, if any one of the levels of cross-correlation satisfies the pruning threshold, then decision block 212 of the pruning process directs the process to block 214 to begin removal of the child filter of the pair.

The pruning threshold is used to determine whether or not the cross-correlation between two filters indicates that the filters are sufficiently similar to allow one of the filters to be removed from the convolution layer. In an exemplary approach, the pruning threshold ("PT") can be quantified in terms of deviation of xcorr( ) from +1 or −1. If xcorr( )=±1, then the filters are perfectly correlated. If the cross-correlation deviates from perfect correlation by less than the PT, then the filters are sufficiently similar to allow one of the filters to be removed. Specifically, if (1−PT)≤xcorr( )≤1 or if −1≤xcorr( )≤(−1+PT), then the cross-correlation satisfies the pruning threshold, and one of the filters can be removed. The value of the pruning threshold can be determined through post-training pruning without calibration, post-training pruning with calibration, or during training of the CNN ML model with pruning in the training loop.

According to an alternative approach, before selecting which child filters are to be removed the levels of cross-correlation between all possible pairs of filters in a layer can be determined, as per the process of blocks 208 and 210. The levels of cross-correlation, which can be referred to as similarity scores, can be stored in association with identifiers of the parent and child filters of each pair. After computing all the levels of cross-correlation, decision block 212 can remove all pairs that do not satisfy the pruning threshold. For the remaining pairs, for each child filter that is paired with only one parent filter, that child filter can be removed per the process of blocks 214, 216, 218, and 220.

Two approaches can be used together or alone to select a pair of filters for pruning if a child filter is paired with more than one parent filter. According to one approach, decision block 212 can evaluate the relative similarity scores of those pairs and select the pair having the highest similarity score. For example, using a tuple format, {parent, child, score} and tuples {0, 1, 0.1}, {0, 2, 0.99}, {0, 3, 0.95}, {1, 2, 0.85}, {1, 3, 0.99}, and {2, 3, 0.89}, and using the highest similarity score, the tuple having parent filter 0 and child filter 2 would be kept, and the tuple having parent filter 1 and child filter 3 would be kept.

According to a second approach, the pair for which removal of the child would provide the greatest level of compression can be selected. If the similarity score of a child filter and a more "popular" parent is less than the highest score but the difference is less than a threshold difference, the tuple having the lesser score could be kept in favor of higher compression. In other words, for a particular child filter paired with multiple parent filters, one of those pairs of filters can be selected for pruning based on the number of other child filters that are paired with each of those multiple parent filters. The popularity of a parent can be based on the number of filters in the layer with which the parent is paired and the similarity scores satisfy the pruning threshold. With reference to the exemplary tuples listed above, the tuple having parent filter 0 and child filter 3 could be kept instead of the tuple having parent filter 1 and child filter 3, if the similarly score of 0.95 between parent filter 0 and child filter 3 is sufficiently close to the highest score (0.99 for {1, 3, 0.99}) and parent filter 0 is sufficiently popular (parent filter 0 is paired with 3 of N filters in the layer).

At block 214, the pruning process determines a scale factor between the child filter and the parent filter. The scale factor is used to restore the output channel of the child filter at the output of the convolution layer, based on the computed output channel of the parent filter. For post-training pruning, the scale factor ("a") is determined by a process that minimizes the difference between the reference child filter (e.g., $F_1$) and the regenerated child filter, which is the parent filter scaled by the scale factor ($\alpha*F_0$). Specifically, the process of determining the scale factor minimizes $\|F_1-\alpha*F_0\|$. The starting scale factor can be $\alpha$=sqrt(dot($F_0 \cdot F_0$)/

($F_1$, $\cdot F_1$)). The same initial starting value for the scale factor can be used for both post-training pruning without and with calibration, and recognized methods can be used to determine the minimum value scale factor that satisfies $\|F_1-\alpha^*F_0\|$.

At block 216, the pruning process stores a tuple that identifies the parent filter and the child filter by way of indices that reference the parent and child filters with respect to other filters in the layer, the value of the scale factor, and the lag/offset between the parent filter and the child filter. The tuple is subsequently used in the pruning process to add regeneration logic for restoring the output channel of the child filter.

At block 218, the pruning process modifies the convolution layer by removing the child filter and adjusting the convolution logic as may be needed to not compute the output channel of the child filter.

At block 220, the pruning process modifies the convolution layer by adding regeneration logic. The regeneration logic restores the output channel of the child filter. The regeneration logic generates the output channel of the child filter by applying the scaling factor of the stored tuple to the output channel of the parent filter and putting the regenerated output channel in the proper order amongst all the output channels of the convolution layer. For example, if $O_0$ is the output channel of parent filter $F_0$, child filter $F_1$ is removed, and the associated scale factor in the tuple is $\alpha$, the regeneration logic restores the output channel of $F_1$ as $\alpha O_0$.

Figure 4:
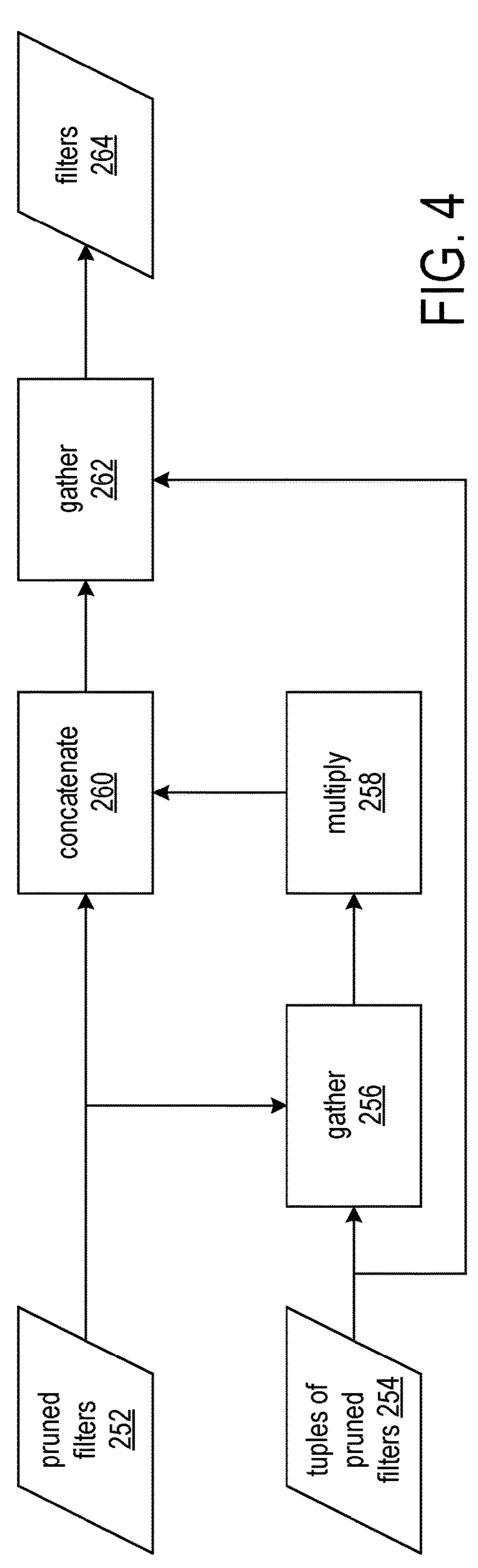
FIG. 4 shows a flow diagram that describes regenerating the filters that were removed as a result of pruning.

FIG. 4 shows a flow diagram that describes regenerating the filters that were removed as a result of pruning. The process can be performed prior to inference in order to determine whether or not pruning of the filters yields acceptable accuracy.

After the pruning process of FIG. 3 has been performed on the CNN ML model, the flow of FIG. 4 can be performed to regenerate the child filters, based on the scale factors, to the convolution layers. The results of pruning can be evaluated by executing the CNN ML model having the parent filters and the regenerated child filters on an input data set, and comparing the results to executing the original CNN ML model having the original filters (the filter set prior to pruning or the "reference filters") on the same input data set.

The pruned filters 252 include the set of filters in the convolution layers of the CNN model after performing the pruning process of FIG. 3, and the tuples of the pruned filters 254 include the tuples resulting from the pruning process. The pruned filters and tuples are input to a gather process 256.

The gather process 256 uses the tuples 254 to determine which filters were removed and identify the associated parent filters. The gather process pairs the identified parent filters from the pruned filters 252 with the associated scale factors from the tuples 254 and provides the pairs of parent filters and scale factors to the multiply process 258.

The multiply process 258 creates regenerated child filters using the pairs of parent filters and scale factors by multiplying each parent filter by the associated scale factor. Each regenerated child filter is provided to the concatenate process 260, which concatenates the regenerated child filters to the pruned filters 252. The filter set including the pruned filters and concatenated regenerated child filters is provided to the gather process 262.

The gather process 262 determines from the tuples 254, the proper positions of the regenerated filters relative to the pruned filters 252. The gather process reorders the filters in the filters set provided by the concatenate process 260 according to the positions of the regenerated filters indicated by the tuples. The resulting reordered filter set is stored as filters 264.

Figure 5:
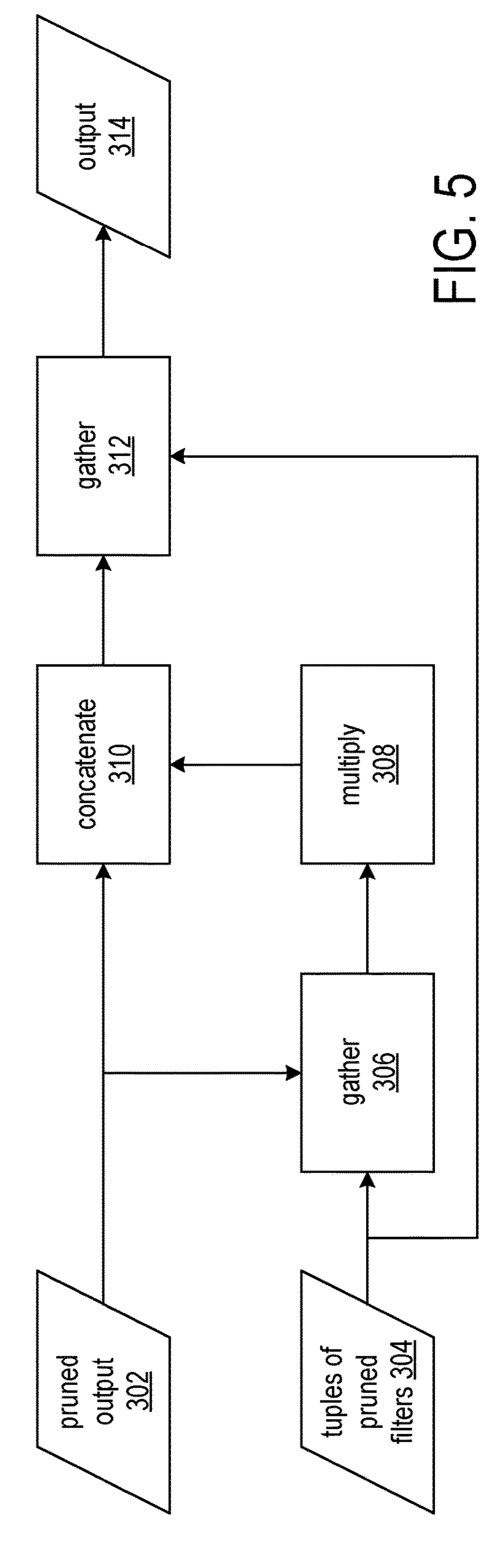
FIG. 5 shows a flow diagram of regeneration logic added to a convolution layer to restore output channels.

FIG. 5 shows a flow diagram of regeneration logic added to a convolution layer of a CNN ML model to restore output channels that were not produced as a result of filters having been removed during pruning.

The pruned output 302 contains the output channels generated by the convolution layer in which the filters have been pruned, and tuples 304 include the tuples resulting from the pruning process on the convolution layer. The pruned output and the tuples are provided to the gather process 306.

The gather process 306 uses the tuples 304 to determine which output channels are absent and identify the associated parent filters and associated output channels ("parent output channel") in the pruned output 302. The gather process pairs the identified output channels from the pruned output 302 with the associated scale factors from the tuples 304 and provides the pairs of output channels and scale factors to the multiply process 308.

The multiply process 308 creates regenerated output channels using the pairs of parent output channels and scale factors by multiplying each parent output channel by the associated scale factor. Each regenerated output channel is provided to the concatenate process 310, which concatenates the regenerated output channel to the pruned output 302. The output channels including the pruned output and concatenated, regenerated output channels are provided to the gather process 312.

The gather process 312 determines from the tuples 304, the proper positions of the regenerated output channels relative to the pruned output 302. The gather process reorders the output channels in the output channel set provided by the concatenate process 310 according to the positions of the regenerated output channels indicated by the tuples. The resulting reordered output channels are stored as output 314. If the gather process 312 were to be followed by another convolution layer, then the gather could be merged with the following convolution layer by rearranging filter input channels of the following convolution layer.

Figure 6:
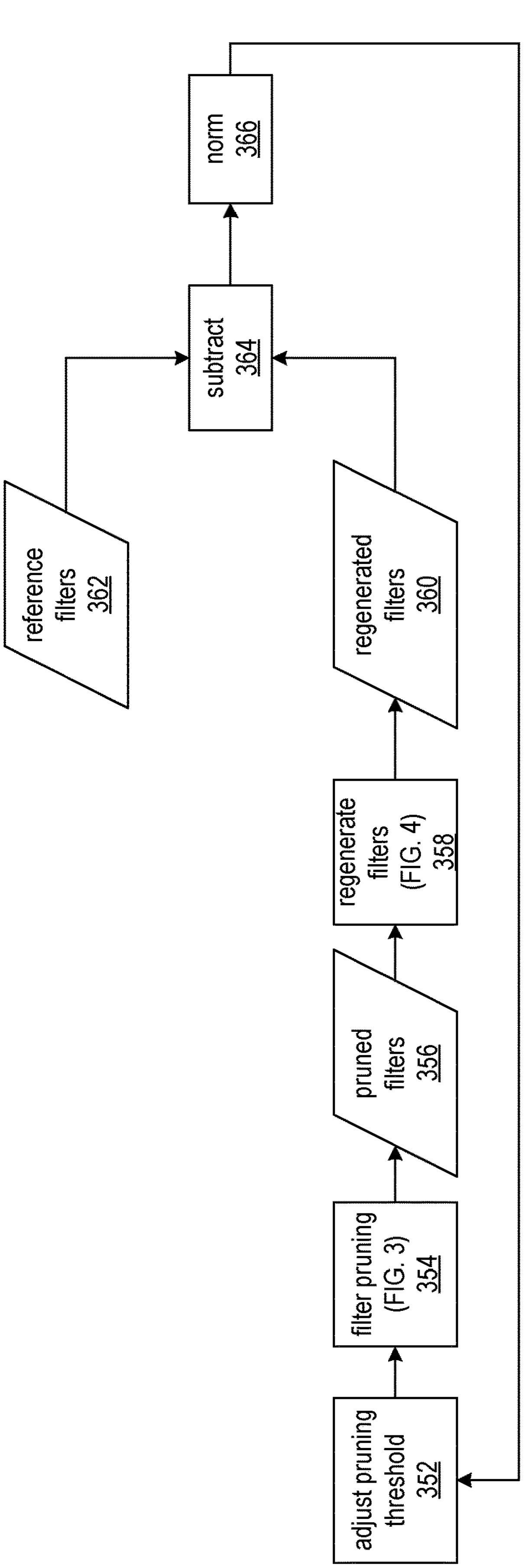
FIG. 6 shows a flow diagram that describes post-training pruning of a CNN without calibration.

FIG. 6 shows a flow diagram that describes post-training pruning of a CNN ML model without calibration. The pruning is performed without calibration in that sample input data to the CNN is not needed for pruning. The flow diagram generally shows adjusting the pruning threshold and repeating the pruning process of FIG. 3 each time the pruning threshold is adjusted.

At block 352 the pruning threshold can be adjusted. The pruning threshold can be initially assigned a value that when used in pruning, is likely to result in pruned filters that cause the CNN to generate results that are less accurate than acceptable so that the pruning threshold can be reduced in the next iteration.

At block 354, the filter pruning process of FIG. 3 is performed on the reference filters of the CNN, and pruned filters 356 are the filters that remain after pruning. At block 358, the regenerate filters process of FIG. 4 is performed using the pruned filters, and regenerated filters 360 are output by process 358.

The reference filters 362 are the original child filters that were removed and correspond to the regenerated filters 360. The subtract 364 process subtracts each regenerated filter from the corresponding reference filter to produce a difference filter ($F_{d0}=F_{ref0}-F_{reg0}$; $F_{d0}$ is the difference filter; $F_{ref0}$ is the original reference filter $F_0$; and $F_{reg0}$ is the corresponding regenerated filter).

The result of the subtract process 364 are tensors ("difference filters") of the same shapes as the filters in the pairs of reference and regenerated filters.

The norm process 366 generates scalar values from the tensors. Each scalar value is the square root of the dot product of the difference filter with itself. For example, for the tensor $F_{d0}$ (difference filter), the norm process computes sqrt $(F_{d0} \cdot F_{d0})$.

The norm process can determine the maximum of the scalar values and provide the maximum value as an accuracy norm to the adjustment process 352 to indicate the level of accuracy achieved by the current pruning threshold.

If the accuracy norm is less than an accuracy tolerance, then the pruning threshold can be reduced to further constrain which filters get pruned. The reduction of the pruning threshold increases the level of similarity needed between filters in a pair for one of the filters to be removed, which may result in fewer filters being removed. If the accuracy norm greater than or equal to the accuracy tolerance, then the pruning threshold can be increased to reduce constraints on which filters get pruned, which may result in more filters being removed. The pruning process can then be repeated using the new pruning threshold. Iterations of the pruning loop can stop once a maximum number of iterations have been performed.

Figure 7:
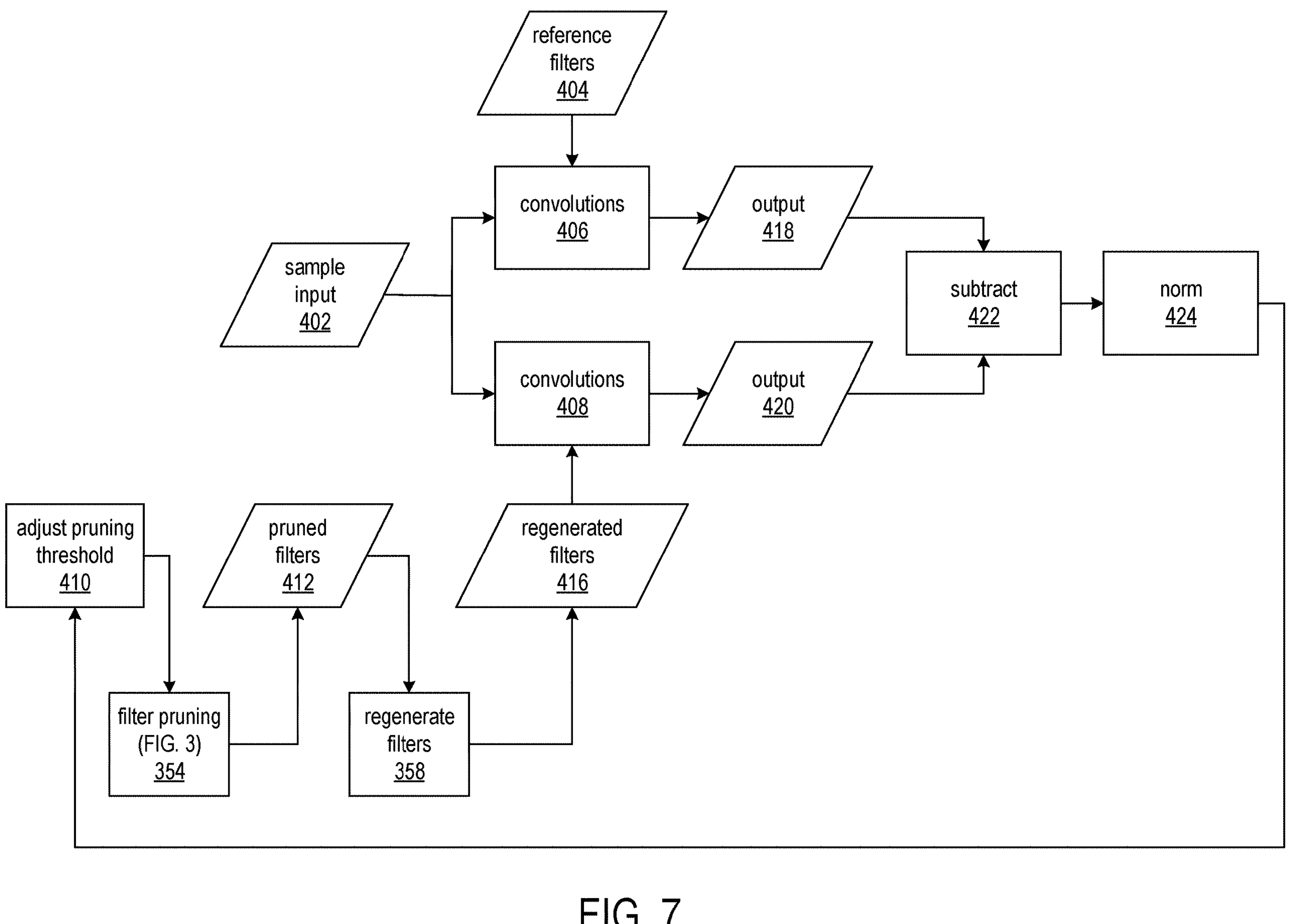
FIG. 7 shows a flow diagram that describes post-training pruning of a CNN with calibration.

FIG. 7 shows a flow diagram that describes post-training pruning of a CNN ML model with calibration. The pruning is performed with calibration in that sample input data to the CNN is used in evaluating accuracy of the pruned CNN. The flow diagram generally shows adjusting the pruning threshold and repeating the pruning process of FIG. 3 with each adjustment of the pruning threshold.

At block 410 the pruning threshold can be adjusted. The pruning threshold can be initially assigned a value that when used in pruning, is likely to result in pruned filters that cause the CNN to generate results that are less accurate than acceptable so that the pruning threshold can be reduced in the next iteration.

At block 354, the filter pruning process of FIG. 3 is performed on the reference filters of the CNN, and pruned filters 412 are the filters that remain after pruning. At block 358, the regenerate process of FIG. 4 is performed using the pruned filters, and regenerated filters 416 are output by process 358. The regenerated filters 416 include the parent filters and regenerated child filters as in filters 264 of FIG. 4.

The CNN is executed twice, as shown by convolutions 406 and 408, on sample input 402, which can be a partial training set. The convolutions 406 use the reference filters 404, which are the original set of filters of the CNN prior to any pruning. The convolutions 408 use the regenerated filters 416. Output 418 includes the output channels generated by convolutions 406, and output 420 includes the output channels generated by convolutions 408.

The subtract process 422 subtracts output channels 420 from corresponding ones of the output channels 418, respectively, and provides the resulting difference output channels to the norm process 424. Each difference output channel is a tensor of the same shape as the output channels used to compute the difference.

The norm process 424 generates scalar values from the tensors. Each scalar value is the square root of the dot product of the difference output channel with itself. The norm process can determine the maximum of the scalar values and provide the maximum value as an accuracy norm to the adjustment process 410 to indicate the level of accuracy achieved by the current pruning threshold.

If the accuracy norm is less than an accuracy tolerance, then the pruning threshold can be reduced to further constrain which filters get pruned. If the accuracy norm greater than or equal to the accuracy tolerance, then the pruning threshold can be increased to reduce constraints on which filters get pruned. The pruning process can then be repeated with using the new pruning threshold. Iterations of the pruning loop can stop once a maximum number of iterations have been performed.

Figure 8:
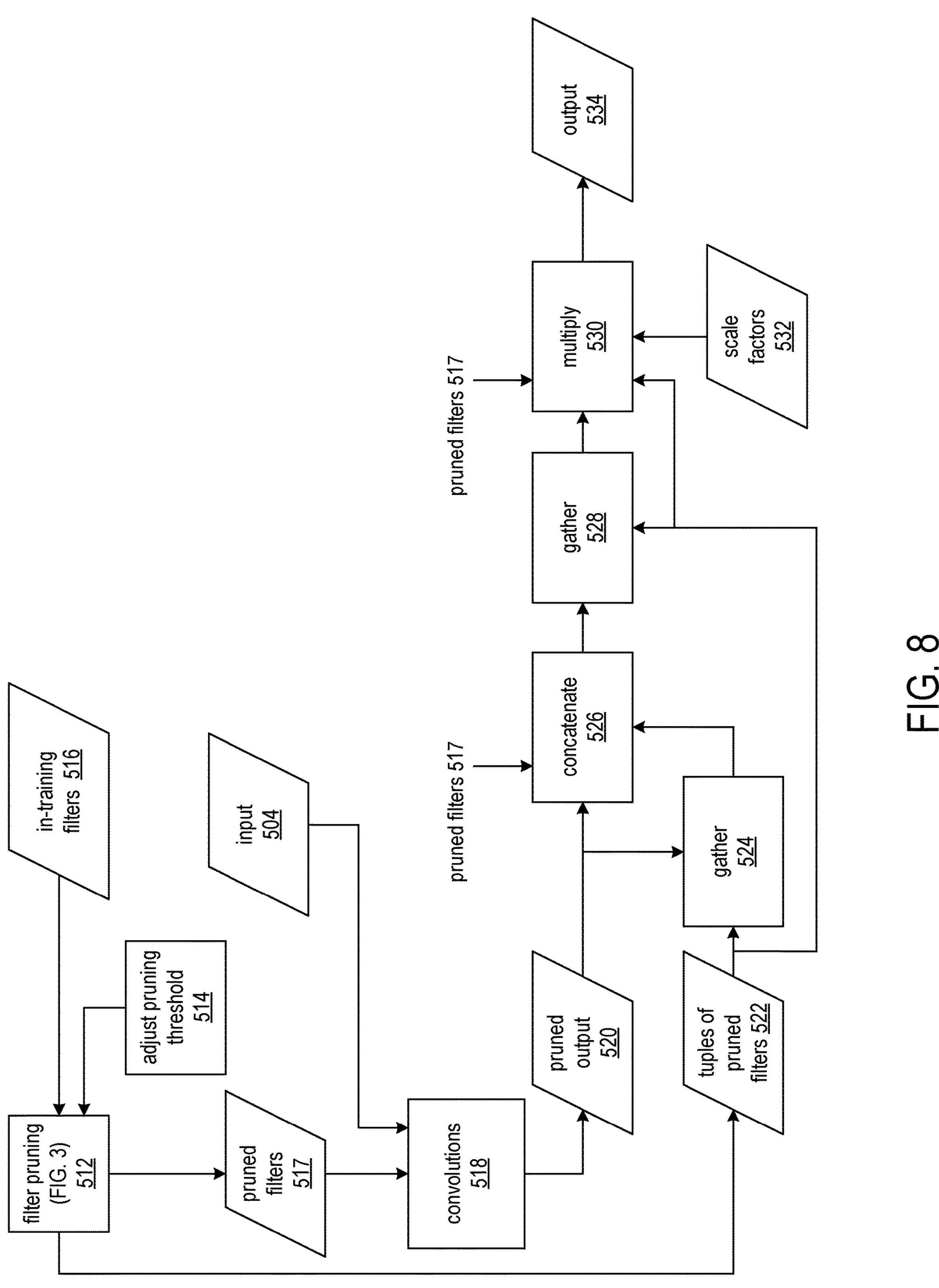
FIG. 8 shows a flow diagram that describes pruning of a CNN and adjusting the pruning threshold within a training loop.

FIG. 8 shows a flow diagram that describes pruning of a CNN ML model and adjusting the pruning threshold within a training loop. The filter pruning analysis could be performed every batch, or alternatively, performed once every epoch to reduce the number of times the filter analysis would need to be performed. That is, the parent/child channels could be determined every batch, or fixed until the next epoch, and the choice of which is one more training knobs used to improve convergence of model accuracy. An epoch is one full cycle through all the training data and may be equal to thousands of batches.

The pruning threshold can be a variable learned during back-propagation. The pruning threshold may be adjusted between every batch, every epoch, or some other user-specified period. For best convergence it is likely that every batch is too often to determine a new set of parent-child tuples. The filters remove by pruning (and by extension the filters that remain) will participate in back-propagation.

At block 514 the pruning threshold can be adjusted. The pruning threshold can be initially assigned a value that when used in pruning, is likely to result in pruned filters that cause the CNN to generate results that are less accurate than acceptable so that the pruning threshold can be reduced in the next iteration.

At block 512, the filter pruning process of FIG. 3 is performed on the in-training filters 516 of the CNN, and pruned filters 517 are the filters that remain after pruning.

The CNN is executed as shown by convolutions 518 using the pruned filters 517 on the input 504. The input can be the output channels generated from a previous convolution layer. The results of convolutions 518 are pruned output channels 520.

The gather process 524 uses the tuples 522 to determine which filters and output channels are absent and to identify the associated parent filters and associated output channels ("parent output channel") in the pruned filters 517 and the pruned output 520. The gather process 524 creates regenerated output channels using the pairs of parent output channels and scale factors by multiplying each parent output channel by the associated scale factor. The gather process 524 also creates place holders for the identified child filters.

The regenerated output channels and place holders of the identified child filters are provided to the concatenate process 526, which concatenates the regenerated output channel to the pruned output 520 and concatenates the place holders of the identified child filters to the pruned filters 517. The output channels including the pruned output and concatenated, regenerated output channels are provided to the gather process 528. The concatenated filter set are also provided to the gather process 528.

The gather process 528 determines from the tuples 522, the proper positions of the regenerated output channels relative to the pruned output 520 and the proper positions of the place holder child filters relative to the pruned filters 517. The gather process reorders the output channels in the output channel set provided by the concatenate process 526 according to the positions of the regenerated output channels indicated by the tuples. The gather process also reorders the filters provided by the concatenate process 526 according to the positions indicated by the tuples 522.

The multiply process 530 regenerates the child filters that were removed in pruning to the filter set provided by the gather process 528. The multiply process 530 uses the tuples 522 to determine the parent filters associated with the child filters and to determine the associated ones of the scale factors 532. The scale factors 532 are variables learnable during back-propagation, and can be initialized to alpha=sqrt $((F_0 \cdot F_0)/(F_1 \cdot F_1))$. The scale factors 532 can be reinitialized each time a new set of tuples 522 is generated by pruning process 512. The multiply process 530 multiplies the identified parent filters by the scale factors to regenerate the child filters.

The output 534 from the multiply process 530 is the regenerated output channels and regenerated filters. The in-training filters 516 can be modified by back-propagation.

In practice, varying degrees of optimizations can be chosen, considering error tradeoffs between the degrees of optimizations. For example, the scale factor ("alpha") may be restricted to ±1, the output edge cases may be filled with a constant (e.g., zero) instead of being computed, and/or the outputs may not be shifted (e.g., [O3, O4, O5]=alpha*[O0, O1, O2] instead of [O3, O4]=alpha*[O1, O2]).

The Conv1D example can be extended with minor modifications to Conv2D and Conv3D. The extension to Conv2D creates a correlation measure in two directions (spatially), which translates into an output correlation in two directions. The mathematical notations for a Conv2D extension are as follows. The dot product between two 2D column/row vectors is:

$$x, y \in R^N = dot(x, y) = \sum_{i=0}^{N-1} x_i * y_i$$

The dot product between two 2D column/row vectors is:

$$x, y \in R^{C,W,H} = \text{dot}(x, y) = \sum_{c=0}^{C-1} \sum_{w=0}^{W-1} \sum_{h=0}^{H-1} x_{c,w,h} * y_{c,h,w}$$

The auto-correlation with lag, t, for a column vector is:

$$x \in R^N = cor(x_r) = cor(x_i, x_{i+t}) = \frac{\text{dot}(x_i, x_{i+t})}{\text{dot}(x, x)} = \frac{\sum_{i=0}^{N-1} x_i * x_{i+t}}{\sum_{i=0}^{N-1} x_i * x_i}$$

where:

$$x_{i+t} = \begin{cases} x_j, \; j \equiv i+t & \text{and } 0 \le j \le N \\ 0, & \text{otherwise} \end{cases}$$

Alternatively, the lagged column vector can be a rotational modulo where the vector is shifted and the end of the vector opposite the shift is filled with the vector values shifted beyond the dimension of the vector:

$$x_{i+t} = x_{i+t \ mod \ N}$$

Cross-correlation with lag, t, for two column vectors is:

$$x, y \in R^N = xcor(x_i, y_{i+t}) = \frac{\text{dot}(x_i, y_{i+t})}{\sqrt{\text{dot}(x, x) * \text{dot}(y, y)}}$$

where $y_{i+t}$ is defined in terms of $y_i$.

The auto-correlation of a 3-dimensional vector with lag, t, is:

$$x \in R^{C,H,W} = cor(x_i, x_{i+t}) = \frac{1}{\text{dot}(x, x)} \sum_{c=0}^{C-1} \sum_{w=0}^{W-1} \sum_{h=0}^{H-1} x_{c,w,h} * x_{c+t_c, h+t_h, w+t_w}$$

where:

$$\begin{aligned} x_{i+t} &= x_{j,k,m} \quad \text{if} \quad j \equiv c + t_c \text{ and } 0 \le j \le C \\ x_{i+t} &= x_{j,k,m} \quad \text{if} \quad k \equiv h + t_h \text{ and } 0 \le k \le H \\ x_{i+t} &= x_{j,k,m} \quad \text{if} \quad m \equiv w + t_w \text{ and } 0 \le m \le W \\ &\text{otherwise } x_{i+t} = 0 \end{aligned}$$

Alternatively, the lagged column vector can be a rotational modulo where the vector is shifted and one of the ends of the vector is filled with the vector values shifted beyond the dimension of the vector:

$$x_{i+t} = x_{i+t \ mod \ C,H,W}$$

The cross-correlation of d-dimensional vectors follows from the definitions set forth herein.

In CNN networks, a convolution is a misnomer for a correlation. Given an input tensor $X \in R^{M,N,Q}$ and output tensor $Y \in R^{R,S,T}$, a correlation described by a tensor $F \in R^{R,M,L,K}$ can be applied as:

$$Z_{i,j,l} = \sum_{m=0}^{M-1} \sum_{n=0}^{N-1} \sum_{q=0}^{Q-1} F_{i,m,n,q} X_{m,j+n,l+q}$$

$$d = (0, s, t) \text{ and } Z_{(i,0,0)+d} = \text{dot}(F_{i,j}, X_{j+d})$$

The vector, $F_i^*$, is called a filter. For example, consider $x=F_i$ and $y=F_j$, we compute $xcor(x_i, y_{i+t})$. If we have $xcor(x_i, y_i)=1$ we have that $xcor(Z_i, Z_j)=1$ thus:

$$\exists \, \alpha \text{ s.t. } Z_i = \alpha Z_j \text{ and } \alpha = xcor(Z_i, Z_j) \frac{\text{dot}(Z_i, Z_i)}{\text{dot}(Z_j, Z_j)}.$$

By construction of the lag, t, and vector $y_{i+t}$ (especially by introducing zeros), $F_i$ and $F_j$ cannot be perfectly correlated. However, if the cross-correlation is considered where instead of zero, the elements of $x_i$ are introduced in the corresponding positions, the filters can be perfectly correlated. However, this definition and operation lose the original meaning of the computation (the filter computation on an input tensor), because we extend a filter $Z_i$ to a different filter based in $Z_j$ which is different, for the only purpose of find a better correlations number.

If instead of a correlation, a discrete and periodic convolution is computed as:

$$y = w \odot x \rightarrow y_i \sum_k w_k * x_{i-k}$$

then the computation is carried in the frequency domain by discrete Fourier transform and the modulo rotation is more appropriate and the same idea and effect of correlation can be carried on.

Figure 9:
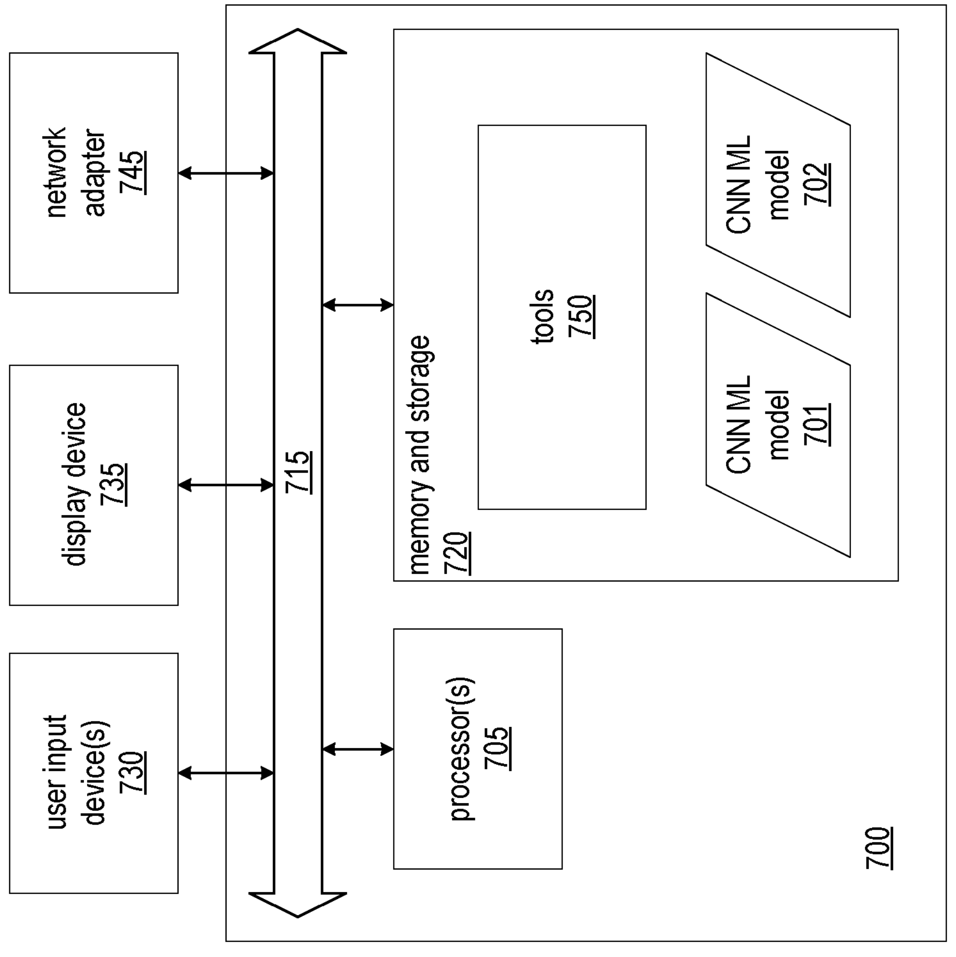
FIG. 9 is a block diagram illustrating an exemplary data processing system.

FIG. 9 is a block diagram illustrating an exemplary data processing system (system) 700. As pictured, system 700 includes at least one processor circuit (or "processor"), e.g., a central processing unit (CPU) 705 coupled to memory and storage arrangement 720 through a system bus 715 or other suitable circuitry. System 700 stores program code and CNN ML model 701 within memory and storage arrangement 720. Processor 705 executes the program code accessed from the memory and storage arrangement 720 via system bus 715. In one aspect, system 700 is implemented as a computer or other data processing system that is suitable for storing and/or executing program code. It should be appreciated, however, that system 700 can be implemented in the form of any system including a processor and memory that is capable of performing the functions described within this disclosure.

Memory and storage arrangement 720 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 700 may also include one or more cache memories (not shown) that provide temporary storage of at least some program code and data in order to reduce the number of times program code and data must be retrieved from local memory and persistent storage during execution.

Input/output (I/O) devices such as user input device(s) 730 and a display device 735 may be optionally coupled to system 700. The I/O devices may be coupled to system 700 either directly or through intervening I/O controllers. A network adapter 745 also can be coupled to system 700 in order to couple system 700 to other systems, computer systems, remote printers, and/or remote storage devices through intervening private or public networks. Modems, cable modems, Ethernet cards, and wireless transceivers are examples of different types of network adapter 745 that can be used with system 700.

Memory and storage arrangement 720 can store tools 750. Tools 750, being implemented in the form of executable program code, are executed by processor(s) 705. As such, tools 750 are considered part of system 700. System 700, while executing tools 750, receives and operates on CNN ML model 701. In one aspect, system 700 performs compilation CNN ML model 701 and pruning of filters of the model. In some systems, the tools can include synthesis, mapping, placement, routing, and bitstream generation for a circuit implementation (e.g., FPGA or ASIC) for performing convolutions. System 700 generates a modified version of CNN ML model 701 as CNN ML model 702.

Tools 750, CNN ML model 701, CNN ML model 702, and any data items used, generated, and/or operated upon by tools 750 are functional data structures that impart functionality when employed as part of system 700 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for pruning filters of a CNN. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method comprising:

pruning filters from a plurality of layers of a convolutional neural network (CNN) by a computer processor, wherein each of the plurality of layers includes pairs of original filters, each pair including a first filter and a second filter and having a level of cross-correlation indicating a level of similarity between the first filter and the second filter, and wherein the pruning includes, for a first pair of the pairs of the original filters:

in response to the level of cross-correlation satisfying a pruning threshold, wherein the pruning threshold specifies a threshold level of cross-correlation:

retaining the first filter in the CNN to generate a first output channel;

removing the second filter and adjusting convolution logic of the CNN; and adding first regeneration logic to the CNN, the first regeneration logic being distinct from training back-propagation, configured to, during inference, generate a second output channel corresponding to the second filter by multiplying the first output channel produced by the first filter by a scale factor computed to minimize, for the trained CNN, a difference between the second filter and a product of the scale factor and the first filter, wherein the scale factor is determined from pre-pruning filter values and is available to the regeneration logic for use during inference and wherein the regenerated second output channel maintains output dimensionality of the layer as prior to pruning so that subsequent layers receive outputs of a same dimensionality without additional training.

2. The method of claim 1, wherein the pruning includes, for a second pair of the pairs of the original filters:

shifting the first filter of the second pair by one or more positions relative to the second filter of the second pair;

in response to a level of cross-correlation between the first filter of the second pair, as shifted, and the second filter of the second pair satisfying the pruning threshold:

retaining the first filter of the second pair in the CNN to generate a third output channel;

removing the second filter of the second pair and adjusting the convolution logic of the CNN; and adding second regeneration logic to the CNN, wherein the second regeneration logic is configured to generate a fourth output channel corresponding to the second filter of the second pair based on a scale factor between the first filter of the second pair, as shifted, and the second filter of the second pair and the third output channel produced by the first filter of the second pair, as shifted.

3. The method of claim 1, wherein the CNN is trained before the pruning, and the pruning includes:
initializing the pruning threshold to an initial value;
for the second filter removed from the CNN:
creating a regenerated second filter from the first filter using the scale factor, the regenerated second filter associated with the removed second filter, and
comparing the regenerated second filter to the removed second filter to determine an accuracy level;
reducing the pruning threshold in response to the accuracy level being less than an accuracy tolerance; and
repeating the pruning of the filters after relaxing the pruning threshold.

4. The method of claim 3, wherein the scale factor is set to a value that minimizes a difference between the regenerated second filter and the removed second filter.

5. The method of claim 1, wherein the CNN is trained before the pruning, and the pruning includes:
initializing the pruning threshold to an initial value;
creating a regenerated second filter from the first filter using the scale factor, the regenerated second filter associated with the removed second filter;
creating a second set of filters including the regenerated second filter and the first filter;
before the pruning, performing first convolutions of the plurality of layers of the CNN using the original filters to produce reference output data;
after the pruning, performing second convolutions of the plurality of layers of the CNN using the second set of filters to produce regenerated output data;
comparing the reference output data to the regenerated output data to determine an accuracy level;
reducing the pruning threshold in response to the accuracy level being less than an accuracy tolerance; and
repeating the pruning of the filters after relaxing the pruning threshold.

6. The method of claim 5, wherein the scale factor is set to a value that minimizes a difference between the reference output data and the regenerated output data.

7. The method of claim 1, wherein:
the CNN is untrained before the pruning; and
the pruning is performed during training of the CNN.

8. The method of claim 7, wherein the scale factor is learned by back-propagation during training of the CNN.

9. The method of claim 1, wherein two or more of the pairs of the original filters have a same child filter and have the levels of cross-correlation that satisfy the pruning threshold, the method further comprising:
selecting for pruning, one pair of the two or more pairs that has a greatest level of cross-correlation.

10. The method of claim 1, wherein parent filters in two or more pairs of the pairs of the original filters have a same child filter and have the levels of cross-correlation that satisfy the pruning threshold, the method further comprising:
selecting for pruning, one pair of the two or more pairs based on respective numbers of the pairs of the original filters having the parent filters and having the levels of cross-correlation that satisfy the pruning threshold.

11. A system comprising:
one or more processors; and
a memory arrangement configured with instructions that when executed by the one or more processors cause the one or more processors to perform operations including:
pruning filters from a plurality of layers of a convolutional neural network (CNN), wherein each of the plurality of layers includes pairs of original filters, each pair including a first filter and a second filter and having a level of cross-correlation indicating a level of similarity between the first filter and the second filter, and wherein the pruning includes, for a first pair of the pairs of original filters:
in response to the level of cross-correlation satisfying a pruning threshold, wherein the pruning threshold specifies a threshold level of cross-correlation:
retaining the first filter in the CNN to generate a first output channel;
removing the second filter and adjusting convolution logic of the CNN; and
adding first regeneration logic to the CNN, the first regeneration logic being distinct from training back-propagation, configured to, during inference, generate a second output channel corresponding to the second filter by multiplying the first output channel produced by the first filter by a scale factor computed to minimize, for the trained CNN, a difference between the second filter and a product of the scale factor and the first filter,
wherein the scale factor is determined from pre-pruning filter values and is available to the regeneration logic for use during inference and wherein the regenerated second output channel maintains output dimensionality of the layer as prior to pruning so that subsequent layers receive outputs of a same dimensionality without additional training.

12. The system of claim 11, wherein:
the instructions for pruning include, for a second pair of the pairs of the original filters instructions that when executed by the one or more processors cause the one or more processors to perform operations including:
shifting the first filter of the second pair by one or more positions relative to the second filter of the second pair;
in response to a level of cross-correlation between the first filter of the second pair, as shifted, and the second filter of the second pair satisfying the pruning threshold:
retaining the first filter of the second pair in the CNN to generate a third output channel;
removing the second filter of the second pair and adjusting the convolution logic of the CNN; and
adding second regeneration logic to the CNN, wherein the second regeneration logic is configured to generate an output channel corresponding to the second filter of the second pair based on a scale factor between the first filter of the second pair, as shifted, and the second filter of the second pair and an output channel produced by the first filter of the second pair, as shifted.

13. The system of claim 11, wherein the CNN is trained before the pruning, and the instructions for pruning include instructions for:

initializing the pruning threshold to an initial value;

for the second filter removed from the CNN:

creating a regenerated second filter from the first filter using the scale factor, the regenerated second filter associated with the removed second filter, and comparing the regenerated second filter to the removed second filter to determine an accuracy level;

reducing the pruning threshold in response to the accuracy level being less than an accuracy tolerance; and repeating the pruning of the filters after relaxing the pruning threshold.

14. The system of claim 13, wherein the scale factor is set to a value that minimizes a difference between the regenerated second filter and the removed second filter.

15. The system of claim 11, wherein the CNN is trained before the pruning, and the instructions for pruning include instructions for:

initializing the pruning threshold to an initial value;

creating a regenerated second filter from the first filter using the scale factor, the regenerated second filter associated with the removed second filter;

creating a second set of filters including the regenerated second filter and the first filter;

before the pruning, performing first convolutions of the plurality of layers of the CNN using the original filters to produce reference output data;

after the pruning, performing second convolutions of the plurality of layers of the CNN using the second set of filters to produce regenerated output data;

comparing the reference output data to the regenerated output data to determine an accuracy level;

reducing the pruning threshold in response to the accuracy level being less than an accuracy tolerance; and repeating the pruning of the filters after relaxing the pruning threshold.

16. The system of claim 15, wherein the scale factor is set to a value that minimizes a difference between the reference output data and the regenerated output data.

17. The system of claim 11, wherein:

the CNN is untrained; and the instructions for pruning are executable during training of the CNN.

18. The system of claim 17, wherein the scale factor is learned by back-propagation during training of the CNN.

19. The system of claim 11, wherein two or more of the pairs of the original filters have a same child filter and have the levels of cross-correlation that satisfy the pruning threshold, and the memory arrangement is further configured with instructions that when executed cause the one or more processors to select for pruning, one pair of the two or more pairs that has a greatest level of cross-correlation.

20. The system of claim 11, wherein parent filters in two or more pairs of the pairs of the original filters have a same child filter and have the levels of cross-correlation that satisfy the pruning threshold, and the memory arrangement is further configured with instructions that when executed cause the one or more processors to:

select for pruning, one pair of the two or more pairs based on respective numbers of the pairs of the original filters having the parent filters and having the levels of cross-correlation that satisfy the pruning threshold.

* * * * *